United States Patent [19]

Pirkey et al.

[11] Patent Number: 5,052,711
[45] Date of Patent: Oct. 1, 1991

[54] VEHICLE ALIGNMENT AND VERIFICATION SYSTEM

[75] Inventors: Herbert L. Pirkey, New Berlin, Wis.; Jon W. Hower, Byron, Ill.; Jean Lezala, Waukesha, Wis.

[73] Assignee: A.O. Smith Corporation, Milwaukee, Wis.

[21] Appl. No.: 525,743

[22] Filed: May 18, 1990

[51] Int. Cl.$^5$ ............................................. B62D 17/00
[52] U.S. Cl. .................................... 280/661; 280/675
[58] Field of Search ............... 280/661, 673, 675, 691, 280/690

[56] References Cited

U.S. PATENT DOCUMENTS

| | | | |
|---|---|---|---|
| 4,424,984 | 1/1984 | Shiratori et al. | 280/661 |
| 4,616,845 | 10/1986 | Pettibone | 280/661 |
| 4,695,073 | 9/1987 | Pettibone et al. | 280/690 |
| 4,706,987 | 11/1987 | Pettibone et al. | 280/661 |
| 4,718,691 | 1/1988 | Specktor et al. | 280/661 |
| 4,736,964 | 4/1988 | Specktor | 280/661 |
| 4,753,454 | 6/1988 | Woemler | 280/661 |
| 4,838,573 | 6/1989 | Specktor et al. | 280/661 |
| 4,863,187 | 9/1989 | Artz | 280/661 |

Primary Examiner—Kenneth R. Rice
Attorney, Agent, or Firm—Andrus, Sceales, Starke & Sawall

[57] ABSTRACT

Method and apparatus are provided for factory pre-aligning vehicle wheels and for subsequently realigning the vehicle wheels after usage and for verifying such re-alignment. A pre-alignment insert (150) is provided for singularly pre-setting the pivot axis of the upper control arm (34) by setting the position of a pivot axis bolt (92) in an elongatged slot (136). The insert (152) is installed on the bolt between an eccentric cam (94) and the sideface (140) of a bracket (130) rigidly connected to the frame (30) and prevents lateral movement of the bolt (92) to limit the bolt to a singular pre-set position. A nut (64) is tightened on the bolt and holds the cam (94) against the insert (150) and to hold the insert (150) against the sideface (140) to in turn hold the cam (94) in a pre-set position in the guide channel (142) on the sideface of the bracket to hold the bolt (p) in a pre-set condition, to provide factory prealignment. The insert also prevents a canted cam condition, to provide a tightly fastened assembly, to prevent premature loss of alignment. After vehicle usage, the nut (64) is loosened, the insert (150) is removed, the bolt (92) is laterally moved in the slot to a desired reset position to previde re-alignment, and the nut is re-tightened to hold the cam (94) against the sideface (140) of the bracket (130), without the insert (150) interposed therebetween. The insert (150) is forwarded to the vechicle manufacturer for verifying re-alignment.

23 Claims, 7 Drawing Sheets

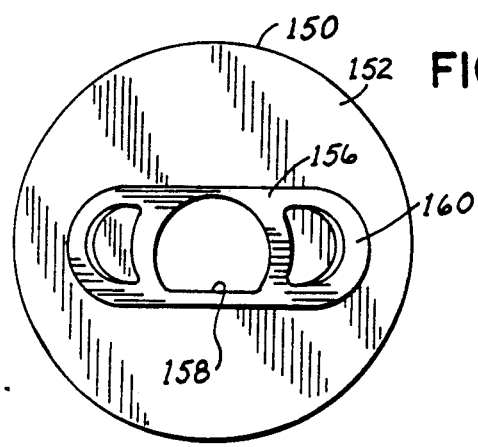
FIG. 20
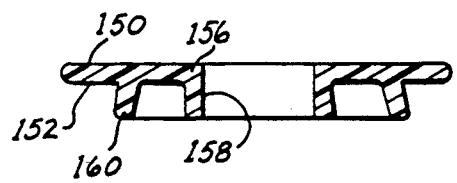
FIG. 21
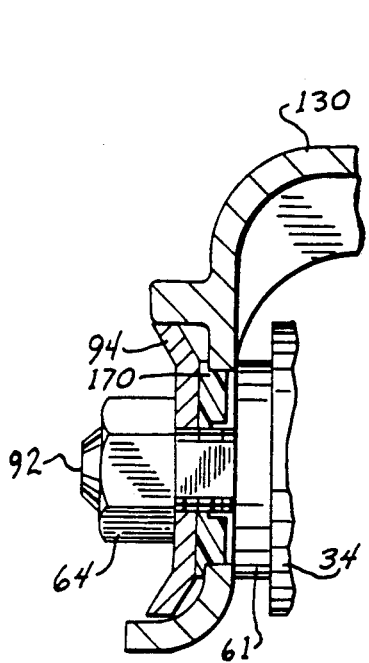
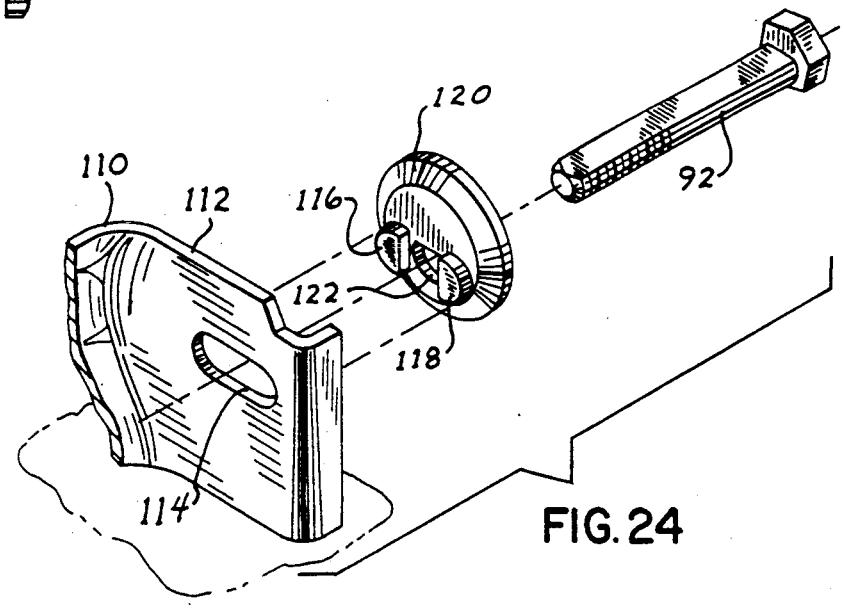
FIG. 22
FIG. 23
FIG. 24

VEHICLE ALIGNMENT AND VERIFICATION SYSTEM

BACKGROUND AND SUMMARY

The invention relates to vehicle alignment systems.

The invention provides a simple and effective self-aligning factory pre-alignment system and fastening operation for vehicle alignment and steering components. The invention also provides evidence that re-alignment has been performed on the vehicle after usage, which evidence is forwarded by the dealer to the manufacturer to verify performance of such re-alignment for reimbursement for work done under warranty.

In a typical frame chassis vehicle, control arms are attached to the frame at control arm brackets using a nut and bolt. Frequently, slotted holes are provided in the upper control arm bracket to allow for alignment of the vehicle after manufacture. One such alignment system uses eccentric cams to make adjustments in alignment. A typical control arm assembly uses a configured bolt, e.g. D-shape, inserted in keyed relation into a like configured offset hole in the cam to position the cam properly within a guide channel on a sideface of the bracket. The channel is on an outer sideface of the bracket between a weld bead or a lanced tab and a flange. Cams are placed on both outer sidefaces of the bracket.

A problem arises during factory assembly because the bolt is free to move within the slotted hole, which results in poor alignment. A prior solution involves forming a circular aperture and scoring lines partially forming tabs therearound which are later punched out by a service technician to change the circular aperture to an elongated slot. The tabs are sent to the manufacturer to verify re-alignment warranty work as appropriate. This solution is objectionable because the partial punching to form the scoring lines is expensive, and because the service technician is required to structurally alter the bracket. Furthermore, the punched-out tabs may be lost or at least difficult to locate. Another problem is that one or both of the cams can be located out of position, causing poor alignment and/or assembly problems. Another problem is slippage of the fastener, which may result in the necessity to re-align the vehicle prematurely.

In the present invention, an insert provides centering of the alignment system during factory assembly, and positions the cam in the proper location, and retards slippage of the fastening device. In addition, removal of the insert is required to re-align the vehicle, which in turn provides proof that re-alignment has been performed. The insert is forwarded to the manufacturer as proof of re-alignment for verification of warranty work.

BRIEF DESCRIPTION OF THE DRAWINGS

Prior Art

Present Invention

Figure 16:
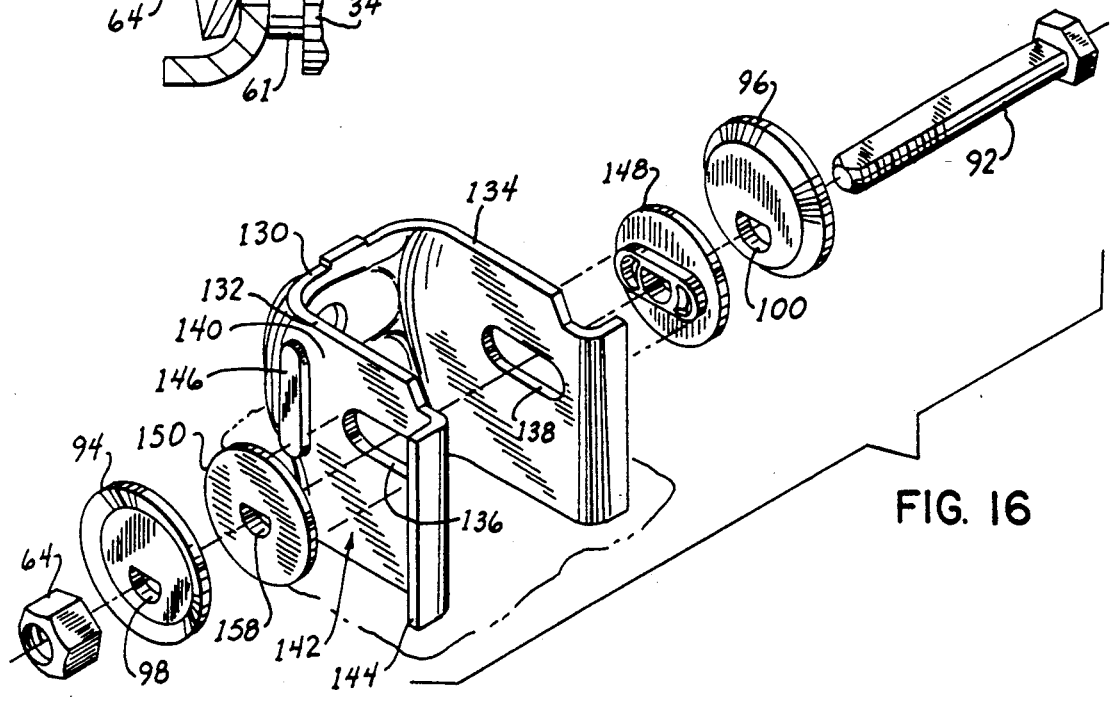

FIG. 16 is an exploded perspective view of alignment apparatus in accordance with the present invention.

Figure 17:
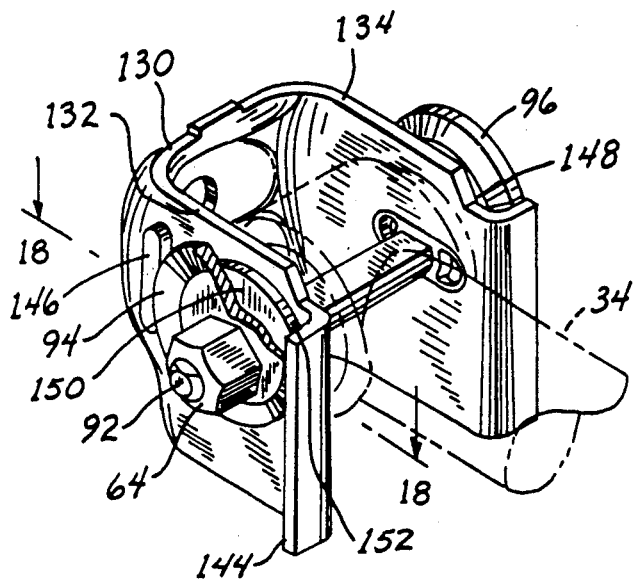

FIG. 17 is a perspective view of the assembled structure of FIG. 16.

Figure 18:
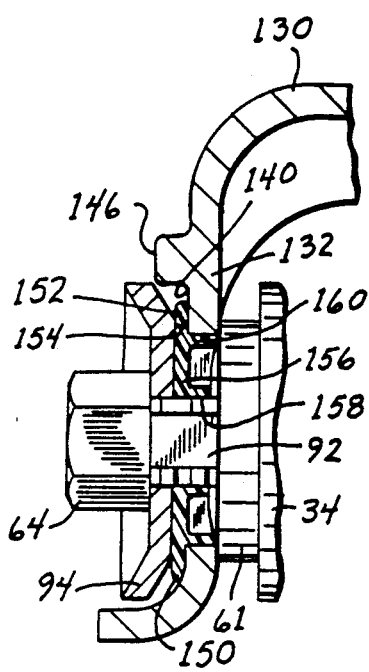

FIG. 18 is a view taken along line 18—18 of FIG. 17.

Figure 19:
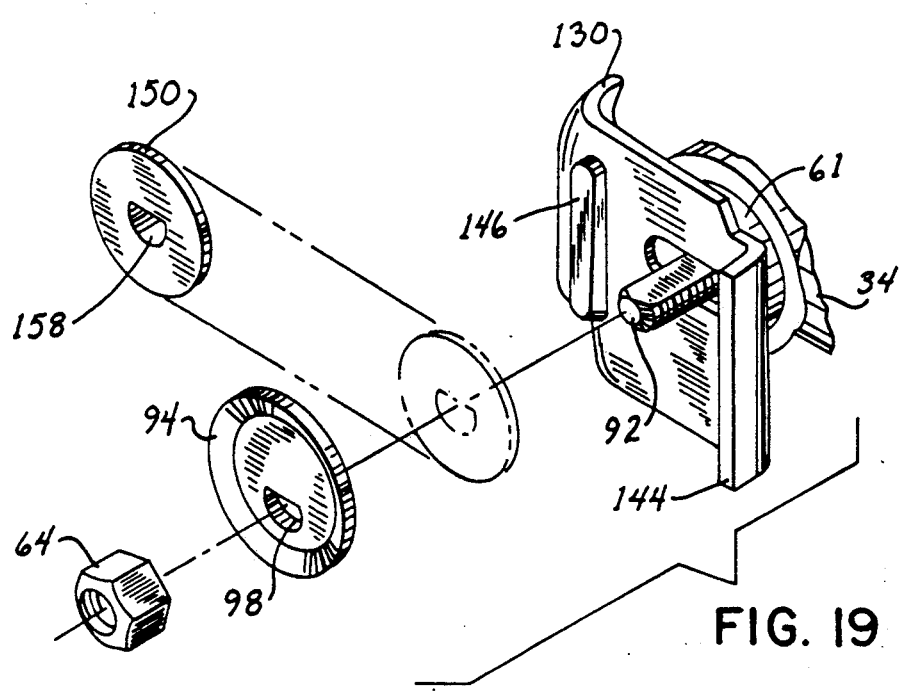

FIG. 19 is a view of a portion of FIG. 16 and illustrates removal of the insert prior to re-alignment.

FIG. 20 is an end view of the insert of FIG. 16.

FIG. 21 is a sectional view of the structure of FIG. 20.

FIG. 22 is a perspective view of an alternate insert in accordance with the invention.

FIG. 23 is a view like FIG. 18 but with the insert of FIG. 22.

FIG. 24 is a view like a portion of FIG. 16 and shows an early attempt of the inventors to address the problems solved by the preferred embodiment of FIGS. 16-21.

DETAILED DESCRIPTION

Prior Art

Figure 1:
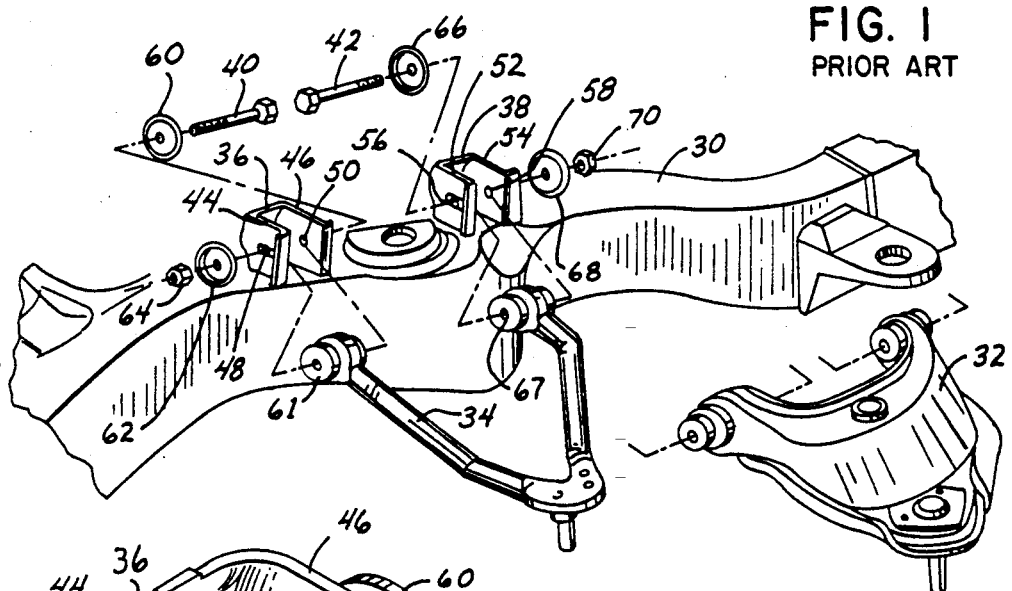
FIG. 1 is a perspective view of an alignment system known in the prior art.

FIG. 1 shows an automotive frame 30 having lower and upper control arm assemblies 32 and 34 mounted thereto. A vehicle wheel (not shown) is mounted to the control arm assemblies, for which further reference may be had to U.S. Pat. No. 4,736,964, incorporated herein by reference. A pair of U-shaped brackets 36 and 38 are rigidly connected to the frame, preferably by welding. The upper control arm is pivotally mounted to brackets 36 and 38 by bolts 40 and 42, respectively, which define the pivot axis of the upper control arm.

U-shaped bracket 36 has legs 44 and 46 with circular apertures 48 and 50 punched all the way therethrough for receiving bolt 40. U-shaped bracket 38 has legs 52 and 54 with circular apertures 56 and 58 punched all the way therethrough for receiving bolt 42. Bolt 40 is inserted through disc-like cam 60, then through aperture 50, then through control arm bushing 61, then through aperture 48, then through cam 62, and is tightened by nut 64 received on the end of bolt 40 in threaded relation. Bolt 42 extends through cam 66, then through aperture 56, then through control arm bushing 67, then through aperture 58, then through cam 68, and is tightened by nut 70 received on the end of bolt 42 in threaded relation.

Figure 3:
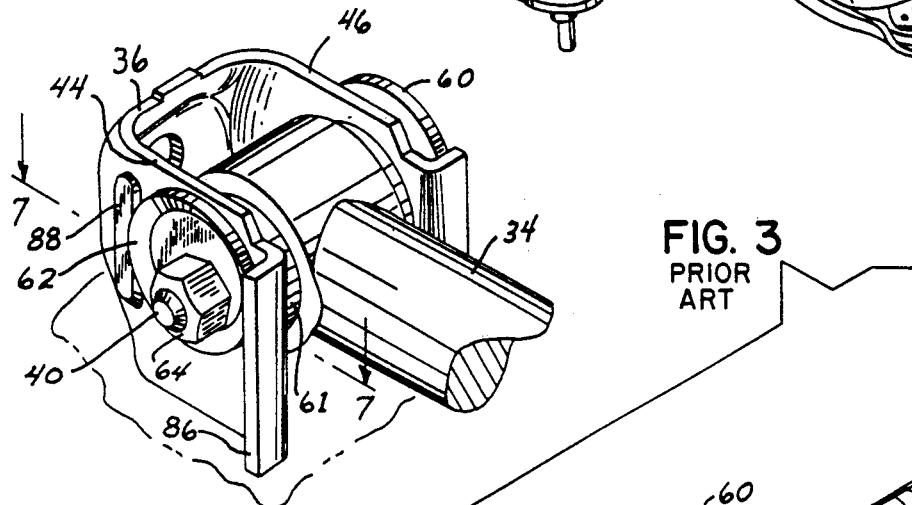
FIG. 3 is an exploded perspective view of the structure of FIG. 2.
Figure 2:
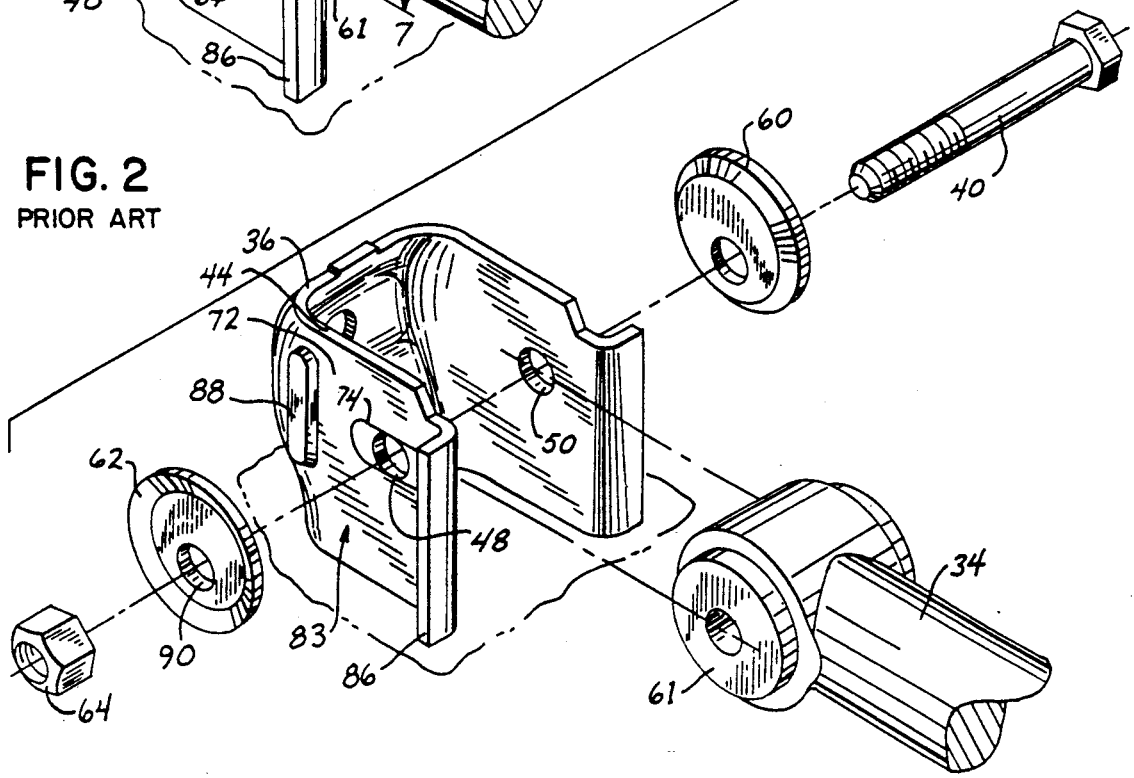
FIG. 2 is an enlarged view of a portion of FIG. 1.

Leg 44 of bracket 36 has an outer sideface 72, FIG. 3, with scoring lines 74 partially punched through the bracket leg. The outer sidefaces of the remaining bracket legs likewise have scoring lines punched partially therethrough. The circular apertures 48, 50, 56, 58 provide precise location of bolts 40 and 42 during factory assembly, and hence precise factory pre-alignment of the vehicle wheel.

Figure 4:
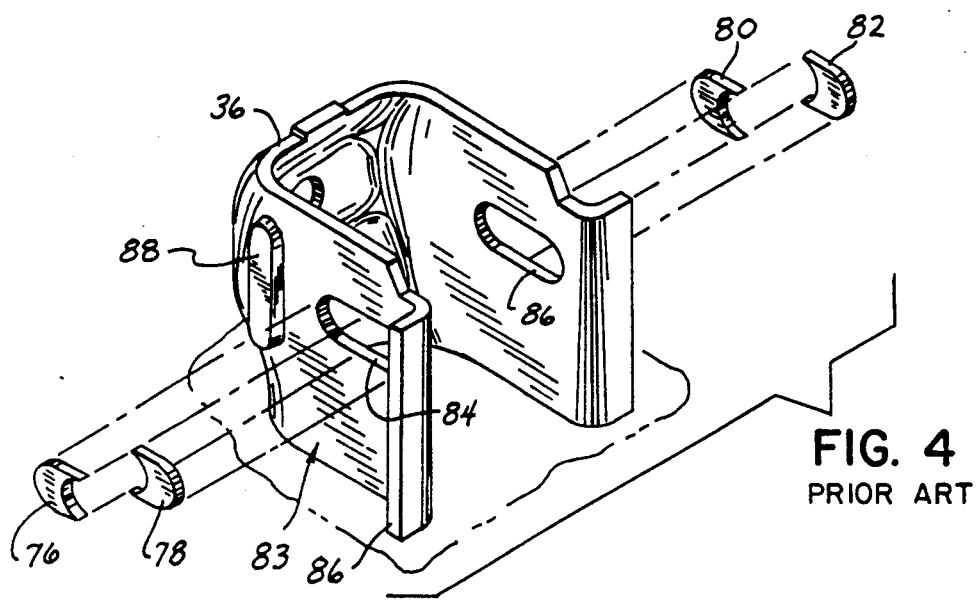
FIG. 4 is a view of a portion of the structure in FIG. 3 and shows a further step wherein tabs are punched out prior to re-alignment.

After the vehicle has left the factory, and after a given amount of usage, the vehicle is typically brought into a dealer for servicing, including wheel alignment. During the wheel alignment procedure, the service technician untorques and loosens nuts 64 and 70, and removes bolts 40 and 42. The tabs partially formed by the scoring lines such as 74 are then punched out, for example as shown in FIG. 4 at tabs 76, 78, 80, 82. This changes the respective circular aperture such as 48 and 50 to an elongated slot or oblong aperture such as 84 and 86. Bolt 40 is then re-installed, and may move laterally along slots 84 and 86 to provide the required alignment, i.e. by laterally moving the pivot axis of the upper control arm. The punching out of tabs for bracket 38 is comparable. The punched-out tabs are sent by the dealer to the vehicle manufacturer to verify that re-alignment has been performed, to in turn verify warranty work as appropriate.

Figure 5:
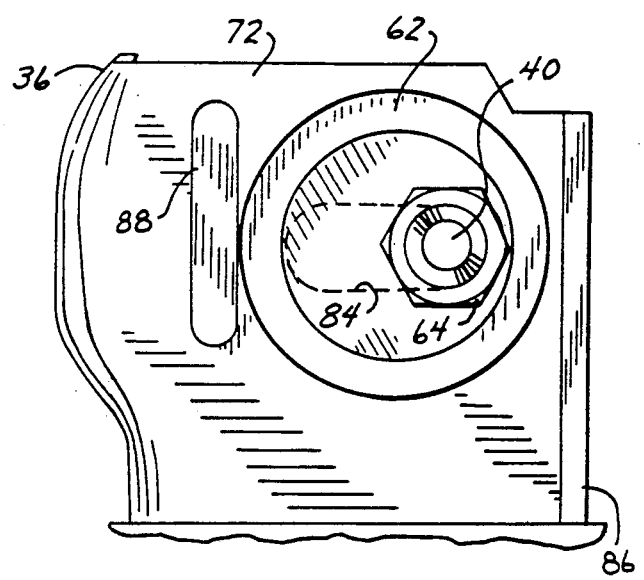
FIG. 5 is an end view of the structure of FIG. 2 after the step shown in FIG. 4.
Figure 6:
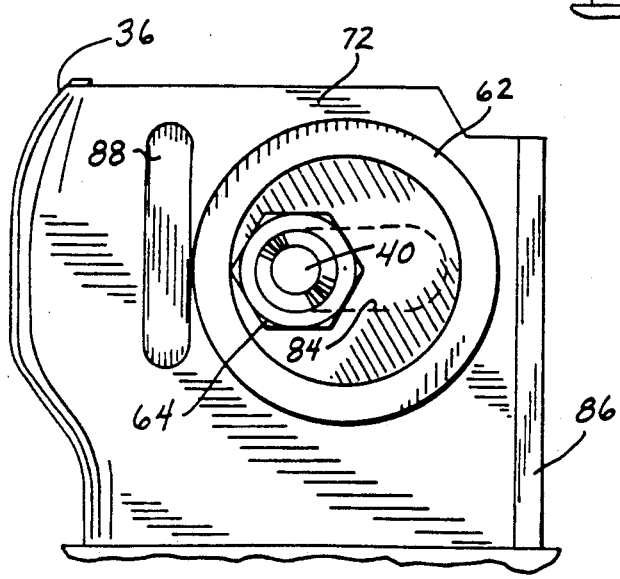
FIG. 6 is like FIG. 5 but shows another alignment position.

Outer sideface 72 of bracket 36 has a guide channel 83 therealong between flange 86 and weldment 88. Some manufacturers may use a lanced tab in lieu of weldment 88. Cam 62 is received in channel 83 and trapped between the channel guide rails provided by flange 86 and weldment 88. Cams 62 has an aperture 90 therethrough offset from the center of the cam, to provide an eccentric cam. Cam 62 may rotate in channel 83 and move up and down therein, but is restrained against lateral movement by channel guide rails 86 and 88. Upon rotation of cam 62 as shown in FIG. 5, bolt 40 moves laterally rightwardly in slot 84 to the right end of the slot, to provide the rightward limit of alignment adjustment. The cam may also be rotated to move bolt 40 laterally leftwardly in slot 84 to the left end of the slot as shown in FIG. 6, to provide the leftward limit of the range of adjustment movement. Cams 60, 66, 68 are similarly rotated in their respective cam guide channels. The respective nut such as 64 is then tightened and torqued to hold the cam in place and prevent rotation of the cam and prevent lateral movement of the respective bolt in its slot in the bracket.

Figure 7:
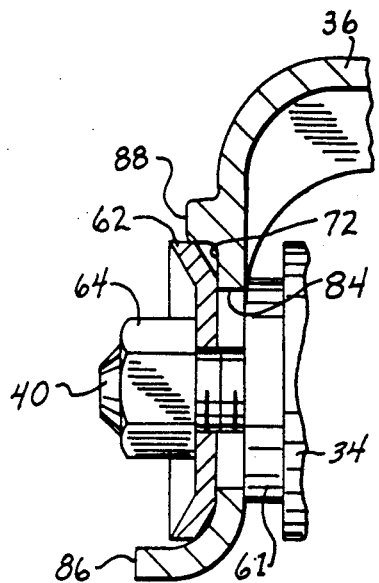
FIG. 7 is a view taken along line 7—7 of FIG. 2 but after the tab removal step of FIG. 4.
Figure 8:
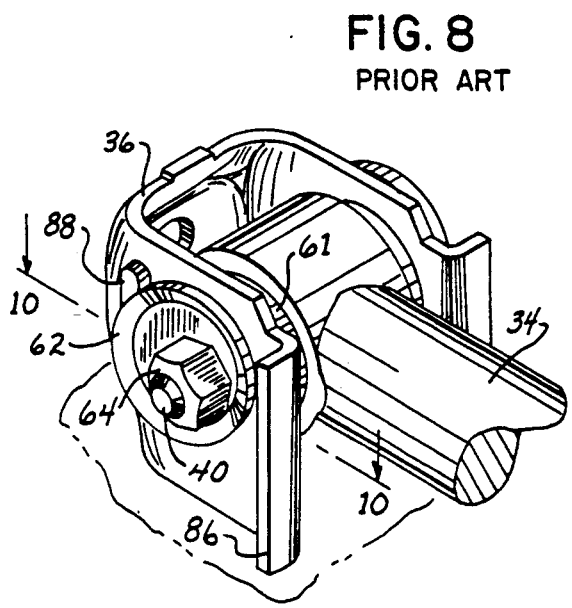
FIG. 8 is a view like FIG. 2 but shows a problem encountered during assembly with canting of the cam.
Figure 9:
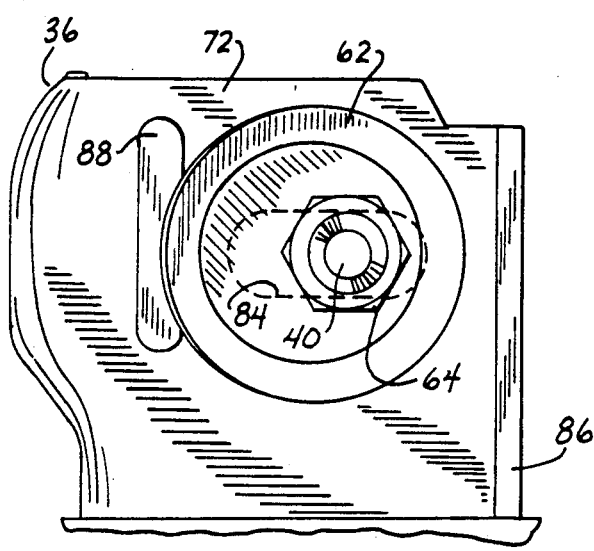
FIG. 9 is a view like FIG. 5 but shows the canted cam of FIG. 8.
Figure 10:
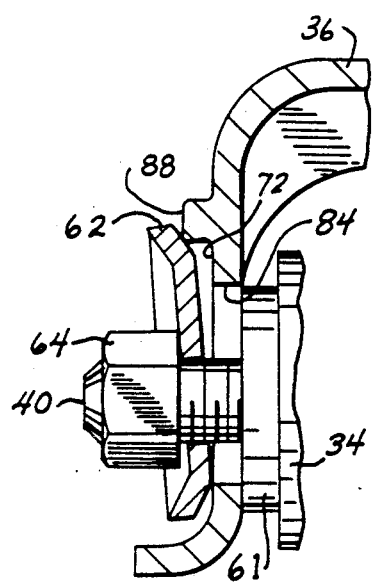
FIG. 10 is a view like FIG. 7 but shows the canted cam of FIGS. 8 and 9.

In tightened condition, cam 62 is preferably flush against outer sideface 72 of the bracket, FIG. 7. Problems can arise when the cam rides up and partially over weldment 88 as shown in FIGS. 8-10, either during factory assembly or during dealer re-alignment. Such canted cam prevents a tightly fastened assembly, which in turn causes premature loss of alignment.

Figure 11:
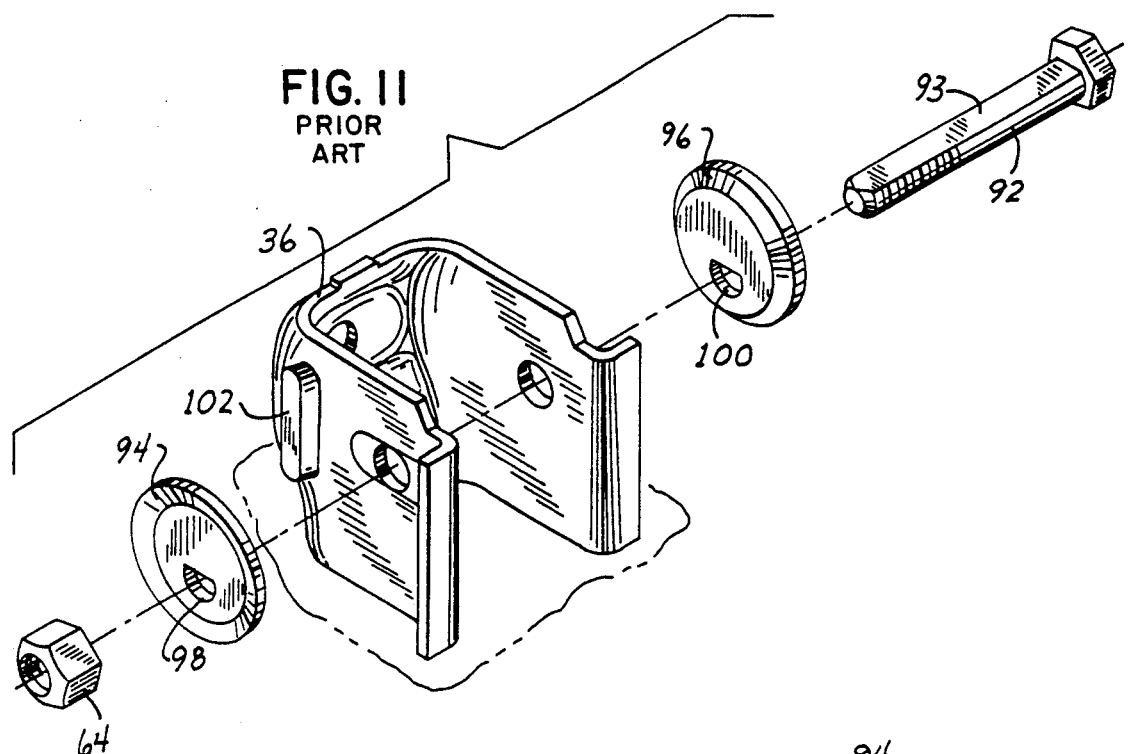
FIG. 11 is a view like FIG. 3 and shows a further embodiment known in the prior art.

In the prior art, it had been long standing practice to provide bolts 40 and 42 of circular cross section. One suggestion in the prior art is to provide the bolts 40 and 42 with a D-shaped configuration, for example as shown at D-shaped bolt 92 with flat surface 93, FIG. 11, and to provide D-shaped apertures in the cams, as shown at cams 94 and 96 with D-shaped apertures 98 and 100, or to provide some other keying configuration. Also in accordance with this proposed solution, weldment 88 is built up to a substantially greater height away from bracket sideface 72, as shown at weldment 102, to prevent cam 94 from riding up and over weldment 102. The D-shaped configuration keys cams 94 and 96 to bolt 92, such that cams 94 and 96 cannot ride up and over the weldments such as 102, unless bolt 92 is also rotated. This provides some assurance of proper cam seating against sideface 72. However, this still requires building up of weldment 102, which is objectionable because of substantially increased cost, as a welded layer is continually built up upon itself, and with the requirement of a substantially straight parallel line relative to flange 86, to maintain guide channel 83.

Figure 12:
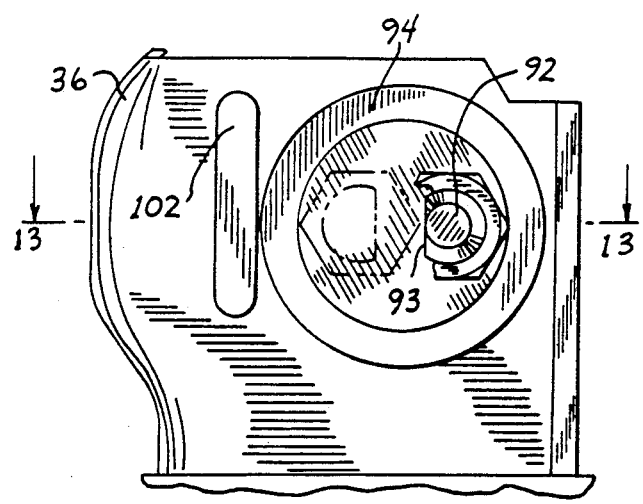
FIG. 12 is a view like FIG. 5 and shows a further embodiment.
Figure 13:
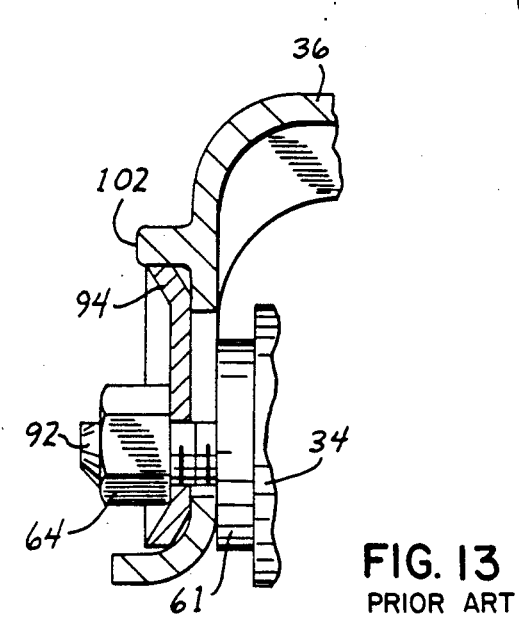
FIG. 13 is a view taken along line 13—13 of FIG. 12.
Figure 14:
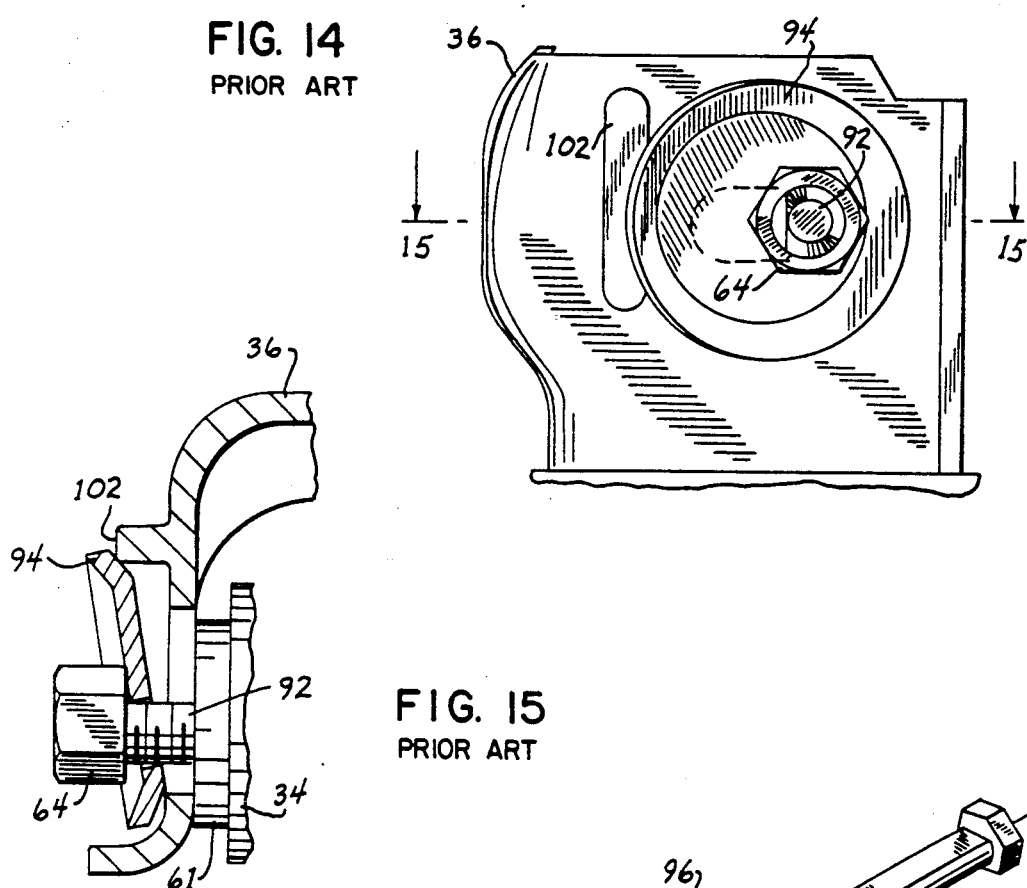
FIG. 14 is a view like FIG. 12 and shows a problem encountered with a canted cam.
Figure 15:
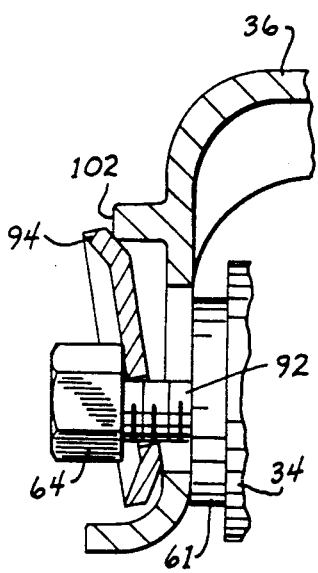
FIG. 15 is a view taken along line 15—15 of FIG. 14.

FIG. 12 shows in solid line bolt 92 at its rightward limit of travel in the bracket slots after punching out of the tabs, and shows in dashed line the leftward limit of travel. FIG. 13 shows the preferred flush contact of cam 94 against sideface 72 of the bracket. FIGS. 14 and 15 show the possible canted cam which may still occur even with the noted proposed solution.

Another objection to the above described alignment system is that the tabs such as 76, 78, 80, 82 may be lost, or at least difficult to locate, after being punched-out by the dealer service technician. This in turn raises problems of verifying that the alignment has been done and that the dealer should be reimbursed for warranty work.

Another objection to the above described alignment system is the cost of the partial punch operation required to form scoring lines 74. The partial punch and then withdrawal is more expensive than simply punching an aperture all the way through the bracket. Another objection is the requirement for the dealer service technician to structurally alter the bracket by punching out or removing by other means tabs 76, 78, 80, 82.

Present Invention

The present invention provides a particularly simple and effective alignment system solving the above noted prior art problems. The invention provides a significant cost reduction by eliminating the partial punch scoring lines 74, and instead punching all the way through the bracket to form the alignment slot. The invention prevents canted cams during factory assembly, to in turn enable flush cam contact and a properly tightened condition to provide a tightly fastened assembly and prevent premature loss of alignment. The invention also provides a simple solution to dealer verification of re-alignment, for confirming warranty work.

FIG. 24 shows an early attempt to solve the above noted problems, and does provide one solution, though not preferred, to be described. Bracket 110 has a leg 112 with an elongated slot 114 formed all the way therethrough, without partial punching. This is desirable because the partial punching, e.g. at scoring lines 74, FIG. 3, is costly since it requires a partial punch and then withdrawal operation. A single punch-through operation is more efficient. A pair of tabs 116 and 118, which may be plastic or other material, are fastened on cam 120 and received in slot 114 to centrally locate cam aperture 122 which receives bolt 92, to singularly locate and pre-set the position of bolt 92 in slot 114 at the factory.

After the vehicle leaves the factory and after usage, the vehicle is returned to the dealer for service, and the service technician removes bolt 92 and then pries off or otherwise dislodges tabs 116 and 118, to allow rotation of cam 120 in its guide channel, and hence lateral movement of bolt 92 in slot 114 for realignment. Tabs 116 and 118 are then forwarded to the vehicle manufacturer to verify re-alignment. While this system is more desirable than the above noted partial punch-through operation at the factory and then later completion and punching out of the tabs by the service technician, there are still objections as to the requirement of fastening or otherwise affixing tabs 116 and 118 to cam 120, and the subsequent requirement of dislodging same and perhaps cleaning off residual epoxy or the like.

FIG. 16 shows the preferred embodiment of the present invention. Bracket 130 is rigidly connected by welding to the frame 30, FIG. 1, and is similar to bracket 36, except that legs 132 and 134 have respective oblong apertures or elongated slots 136 and 138 formed all the way therethrough, as in FIG. 24, without partial punching of scoring lines such as 74, FIG. 3. Bracket leg 132 has an outer sideface 140 with a guide channel 142 therealong between flange 144 and weldment 146. The other leg 134 of the bracket likewise has a comparable outer sideface. Another bracket like bracket 130 is welded on frame 30, comparably to bracket 38 in FIG. 1. D-shaped bolt 92 and cams 96 and 94 are the same as those above described, and hence the same reference numerals are used. Bolt 92 extends through aperture 100 of cam 96 then through insert 148, then through slot 138 then through upper control arm bushing 61, then through slot 136, then through insert 150, then through aperture 98 of cam 94, and has nut 64 tightened on the end of the bolt in threaded relation.

Insert 150 is a plastic or other material member installed at the factory. Insert 148 and other inserts for each of the outer sidefaces of the legs of the brackets are comparable. Insert 150 has an outer peripheral flange portion 152, FIGS. 17, 18, engaged and squeezed between outer facing surface or sideface 140 of bracket 130 and inner facing surface 154 of cam 94. Flange portion 152 spaces facing surfaces 140 and 154 by a small gap defined by the thickness of flange portion 152. Insert 150 has a hub portion 156 with an inner configuration providing an aperture or opening 158 preferably of D-shape matching D-shape bolt 92 and receiving such bolt in close fitting relation to singularly locate and pre-set the bolt in bracket slot 136 and prevent lateral movement of the bolt along the slot and prevent rotation of the bolt. Hub portion 156 of insert 150 has an outer configuration 160 of given dimension matching the dimension of slot 136 to nest hub portion 156 into slot 136 and precisely locate bolt 92 and prevent rotation of the bolt. Insert 148 is comparable.

Inserts 150 and 148 for bracket 130, and other inserts for other brackets, are installed at the factory and provide pre-alignment inserts singularly presetting the pivot axis of the upper control arms. The tightening nuts such as 64 are tightened and torqued down to hold the respective cams such as 94 and 96 in place to in turn hold the pivot axis of the upper control arm along bolt 92 in the pre-set position. Inserts 150 and 148 remain installed when the vehicle leaves the factory. The canted cam problem is solved because bolt 92 is prevented from rotating, which in turn prevents rotation of the cams and hence prevents such cams from riding up and over the weldments such as 146. This enables the tight flush fit assembly as shown in FIG. 18, and hence the assembly may be properly tightened to a tightly fastened condition, to prevent premature loss of alignment. This also eliminates the need to build up the weldment as at 102 in FIG. 11. Instead, the invention enables a much lower height weldment 146, and hence provides further cost savings.

After the vehicle has left the factory, and after a given amount of usage, the vehicle is brought into a dealer for servicing. The service technician loosens nut 64, slides out bolt 92, removes inserts 150 and 148 as shown in FIG. 19, and then re-inserts bolt 92 and rotates cams 94 and 96 to translate bolt 92 laterally along slots 136 and 138 to provide required re-alignment, and then tightens and retorques nut 64. The inserts such as 150 are then forwarded to the vehicle manufacturer to verify that re-alignment has been performed. The dealer service technician need not punch out tabs such as 76, 78, 80, 82, nor otherwise structurally alter bracket 130.

Insert 150 provides a simple method and device for providing precise factory pre-alignment with a disposable member which is subsequently forwarded to the vehicle manufacturer to verify re-alignment. The dealer service technician need not punch out tabs from scoring lines on the bracket, nor retrieve same. The service technician merely removes the insert, and re-tightens the assembly without structurally changing the bracket. The dealer forwards the insert to the manufacturer to verify re-alignment, and hence verify warranty work as appropriate. Furthermore, insert 150 eliminates the above problems with canting of the cam because only a singular preset condition of the bolt and the cam is possible with the insert of the present invention.

The apparatus in accordance with the invention thus has a first condition during factory pre-alignment, FIG. 18, with insert 150 installed between sideface 154 of cam 94 and sideface 140 of bracket 130, and with insert 150 remaining installed in place between sidefaces 154 and 140 upon leaving the factory. Such apparatus has a second condition after vehicle usage upon re-alignment wherein insert 150 is removed to eliminate the gap between sidefaces 154 and 140 such that sidefaces 154 and 140 directly engage each other in abutting relation.

FIGS. 22 and 23 show an alternate insert 170 with flange portion 172 and hub portion 174 having extensions 176 and 178 extending into the bracket slot, comparably to tabs 116 and 118 in FIG. 24. Opening 180 receives bolt 92.

It is recognized that various equivalents, alternatives and modifications are possible within the scope of the appended claims.

We claim:

1. A method for factory pre-aligning vehicle wheels comprising providing a frame, providing a vehicle wheel control arm and pivotally mounting said arm to said frame by mounting means including a rotating eccentric cam for changing the pivot axis of said control arm according to the rotational position of said cam, singularly pre-setting the pivot axis of said control arm with pre-alignment insert means removably mounted to said mounting means, providing said mounting means with tightening means and tightening same to hold said cam in place to in turn hold said pivot axis in the pre-set position, with said insert means remaining installed.

2. The invention according to claim 1 comprising loosening said tightening means, removing said insert means, rotating said cam to re-set the pivot axis of said control arm to provide re-alignment, and retightening said tightening means to hold said cam in place to in turn hold said pivot axis in the re-set position.

3. The invention according to claim 1 comprising providing said mounting means with a bracket rigidly connected to said frame, and pivotally mounting said control arm to said bracket, providing said bracket with a sideface having a guide channel therealong receiving said cam, installing said insert means between said cam and said sideface and spacing said cam slightly away from said sideface.

4. The invention according to claim 3 comprising providing said bracket with an elongated slot formed all the way therethrough without partial punching, and providing said mounting means with a bolt mounting said control arm to said bracket and defining said pivot axis, with said bolt being laterally movable along said slot to change the pivot axis, providing said insert means with a portion occupying a portion of said slot and preventing lateral movement of said bolt to limit said bolt to a singular position.

5. The method according to claim 4 further comprising loosening said tightening means, removing said insert means, transversely moving said bolt along said slot to change the pivot axis to provide re-alignment, and re-tightening said tightening means to hold said cam against said sideface to hold the bolt and pivot axis in a re-set position.

6. A method for factory pre-aligning vehicle wheels comprising providing a frame, providing a bracket rigidly connected to said frame, providing a vehicle wheel control arm and pivotally mounting said arm to said bracket by mounting means including a rotating eccentric cam for changing the pivot axis of said control arm according to the rotational position of said cam, singularly pre-setting the pivot axis of said control arm with pre-alignment insert means removably mounted to said mounting means, providing said mounting means with tightening means and tightening same to hold said cam in place to in turn hold said pivot axis in the pre-set position, with said insert means remaining installed, providing said bracket with a sideface having a guide channel defined by at least one guide rail therealong, non-rotatably installing said insert means between said cam and said sideface, providing said bracket with an elongated slot formed all the way therethrough, without partial punching, and providing said mounting means with a bolt mounting said control arm to said bracket and defining said pivot axis, with said bolt being laterally movable along said slot to change the pivot axis, and with said bolt extending through said slot, said insert means and said cam, and keying said insert means to said bolt and said bolt to said cam such that non-rotation of said insert means prevents rotation of said bolt which in turn prevents rotation of said cam which prevents said cam from riding up and over said guide rail in a canted cam condition, and instead provides flush contact of said cam against said insert means along said channel to provide a tightly fastened assembly and prevent premature loss of alignment.

7. A method for factory pre-aligning vehicle wheels and for subsequently re-aligning the vehicle wheels after usage and for verifying such re-alignment, comprising providing a frame, providing a bracket having a sideface with a guide channel therealong, forming an elongated slot all the way through said sideface without partial punching, rigidly connecting said bracket to said frame, pivotally mounting a vehicle wheel control arm to said bracket by a bolt extending through said slot and through an eccentric cam confined along said channel and rotatable to change the pivot axis of said control arm by changing the lateral position of said bolt along said slot, providing a pre-alignment insert for singularly pre-setting the pivot axis of said control arm by setting the position of said bolt in said slot, installing said insert on said bolt between said cam and said sideface and having a portion occupying a portion of said slot and preventing lateral movement of said bolt to limit said bolt to a singular pre-set position, providing tightening means on said bolt and tightening same against said cam to hold said cam against said insert and to hold said insert against said sideface to in turn hold said cam in a pre-set position in said channel to hold said bolt in the pre-set position, to provide factory pre-alignment, and further comprising, after vehicle usage, loosening said tightening means, removing said insert, laterally moving said bolt in said slot to a desired re-set position to provide re-alignment of the pivot axis of said control arm, re-tightening said tightening means against said cam to hold said cam against said sideface, without said insert interposed therebetween, to hold said cam in place in said channel to prevent lateral movemnet of said bolt to limit said bolt to the re-set position, to provide re-alignment, and forwarding said removed insert to the vehicle manufacturer for verifying re-alignment.

8. A method for factory pr.e-aligning vehicle wheels and for subsequently re-aligning the vehicle wheels after usage and for verifying such re-alignment, comprising providing a frame, providing a vehicle wheel control arm and pivotally mounting said arm to said frame by mounting means including a bracket rigidly connected to said frame and a rotating eccentric cam for changing the pivot axis of said control arm according to the rotational position of said cam, providing pre-alignment insert means singularly pre-setting the pivot axis of said control arm, installing said insert means to provide factory pre-alignment, providing tightening means and tightening same to hold said cam in place to in turn hold said pivot axis in the pre-set position, with said insert means remaining installed, subsequently re-aligning the vehicle wheels after usage by loosening said tightening means, removing said insert means, re-tightening said tightening means to hold said pivot axis in a re-set position, with said insert means remaining removed, and forwarding said insert means to the vehicle manufacturer to verify re-alignment.

9. The method according to claim 8 comprising forming an elongated slot all the way through said bracket without partial punching, and comprising removing said insert without structurally altering said bracket or otherwise removing partially punched tabs.

10. The invention according to claim 9 comprising engaging said insert between said cam and said bracket during factory pre-alignment, leaving said insert installed and engaged between said cam and said bracket until re-alignment, removing said insert, engaging said cam against said bracket during re-alignment, and forwarding said insert to the vehicle manufacturer.

11. The invention according to claim 9 comprising non-rotatably mounting said insert against said bracket, and keying said insert to said bolt and said bolt to said cam such that non-rotation of said insert prevents rotation of said bolt which in turn prevents rotation of said cam to prevent said cam from riding out of said channel in a canted cam condition, to provide flush cam contact and a tightly fastened assembly to prevent premature loss of alignment.

12. Apparatus for vehicle wheel alignment comprising a frame, a vehicle wheel control arm pivotally mounted to said frame by mounting means including a rotating eccentric cam for changing the pivot axis of said control arm according to the rotational position of said cam, pre-alignment insert means singularly presetting the pivot axis of said control arm, said mounting means including tightening means for holding said cam in place to in turn hold said pivot axis in the pre-set position.

13. The invention according to claim 12 wherein said mounting means includes a bracket rigidly connected to said frame and pivotally mounting said control arm, wherein said insert means is engaged by both said cam and said bracket.

14. The invention according to claim 13 wherein said insert means is engaged between said cam and said bracket.

15. The invention according to claim 14 wherein said cam and said bracket have generally planar sidefaces facing each other across a small gap defined by said insert means therebetween.

16. The invention according to claim 15 wherein said apparatus has a first condition during factory pre-alignment with said insert means installed between said sidefaces of said cam and said bracket, and wherein said insert means remains installed in place between said sidefaces of said cam and said bracket upon leaving the factory, and wherein said apparatus has a second condition after vehicle usage upon re-alignment wherein said insert means is removed to eliminate said gap such that said sidefaces of said cam and said bracket directly engage each other in abutting relation.

17. The invention according to claim 12 wherein said mounting means includes a bracket rigidly connected to said frame and pivotally mounting said control arm, and wherein said insert means is installed against said bracket, and is removed from said bracket upon re-alignment without structurally altering said bracket and remains removed from said bracket after said re-alignment, with said tightening means holding said cam in a desired rotation position to in turn hold said pivot axis in a desired alignment position without being restricted to said pre-set position.

18. The invention according to claim 17 wherein said bracket has a sideface with a guide channel therealong receiving said cam, said insert means includes a portion engaged between said cam and said sideface and spacing said cam slightly away from said sideface, and wherein said cam engages said sideface after removal of said insert means.

19. The invention according to claim 17 wherein said bracket has an elongated slot formed all the way therethrough without partial punching, and wherein said mounting means comprises a bolt mounting said control arm to said bracket and defining said pivot axis, said bolt being laterally movable along said slot to change the pivot axis, and wherein said insert means occupies a portion of said slot and prevents lateral movement of said bolt to limit said bolt to a singular position.

20. The invention according to claim 19 wherein said channel is defined by at least one guide rail on said bracket, and wherein said portion of said insert means in said slot prevents rotation of said insert means, and wherein said insert means is keyed to said bolt and said bolt is keyed to said cam, such that non-rotation of said insert means prevents rotation of said bolt which prevents rotation of said cam to prevent said cam from riding up and over said guide rail in a canted condition and maintains said cam in flush contact in said channel to provide a tightly fastened assembly and prevent premature loss of alignment.

21. Apparatus for vehicle wheel alignment, comprising:
a frame;
a bracket rigidly connected to said frame and having a sideface with a guide channel therealong and an elongated slot therethrough;
a control arm for mounting a vehicle wheel;
a bolt mounting said control arm to said bracket and extending through said elongated slot and laterally movable therealong to adjust alignment;
a generally flat disc-like cam having an opening therethrough offset from the center of the cam to provide an eccentric cam, wherein said bolt extends through said opening;
a nut tightened on said bolt against said cam to hold said cam against rotation in said channel to in turn prevent lateral movement of said bolt along said slot, and such that upon loosening of said nut, said cam may be rotated in said channel to laterally move said bolt in said slot to in turn adjust alignment;
factory-installed pre-alignment means providing precise pre-alignment during assembly, comprising an insert between said cam and said sideface, said insert having an opening therethrough receiving said bolt, said insert having a given dimension matching a given dimension of said bracket such that upon tightening of said nut, said insert assumes a singular position between said cam and said bracket which singularly locates said bolt in said slot and said cam in said channel, said insert being removable to allow alignment adjustment after vehicle usage, such that upon loosening of said nut and removal of said insert, said cam may rotate in said channel and said bolt may move laterally in said slot to a desired position, and such that upon re-tightening of said nut, said cam is tightened against rotation in said channel.

22. The invention according to claim 21 wherein said channel is defined by at least one guide rail extending away from said sideface, said bolt and said opening in said cam have given configurations keyed to each other such that they rotate together, said opening in said insert has a configuration matching said opening in said cam such that said opening in said insert not only locates said bolt laterally in said slot but also prevents rotation of said bolt which in turn prevents rotation of said cam to thus locate said cam within said channel and prevent canting or sliding of said cam up and over said guide rail.

23. The invention according to claim 21 wherein said bracket and said cam are structurally rigid metal members, and said insert is a plastic member having an outer peripheral flange portion engaged between said cam and said sideface of said bracket upon tightening of said nut, said plastic member having a hub portion around said bolt and occupying a portion of said slot to singularly locate said bolt in said slot until said nut tightens said cam to prevent lateral movement of said bolt in said slot.

* * * * *